US009253748B2

(12) United States Patent
Goldin

(10) Patent No.: US 9,253,748 B2
(45) Date of Patent: Feb. 2, 2016

(54) NETWORK-ENABLED LIGHT FIXTURE FOR LOCATING MOVABLE OBJECT

(71) Applicant: Cisco Technology, Inc., San Jose, CA (US)

(72) Inventor: Leonid Goldin, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 13/972,420

(22) Filed: Aug. 21, 2013

(65) Prior Publication Data

US 2015/0057013 A1    Feb. 26, 2015

(51) Int. Cl.
*H04W 64/00* (2009.01)
*H04W 4/02* (2009.01)
*G01S 5/02* (2010.01)
*H05B 37/02* (2006.01)

(52) U.S. Cl.
CPC ........... *H04W 64/00* (2013.01); *H05B 37/0227* (2013.01); *H05B 37/0272* (2013.01)

(58) Field of Classification Search
CPC ....... H04W 64/00; H04W 4/02; H04W 4/021; H04W 64/006; H04W 88/08; H04W 48/20; G01S 5/02; G01S 5/0009; H04L 67/22; H04M 2250/04; H04M 1/04; H05B 37/0227; H05B 37/0272
USPC .............. 455/41.1, 41.2, 561.1, 456.1, 456.2; 340/10.1, 10.42, 426.2, 426.25, 340/426.19, 539.22, 545.3, 545.2
See application file for complete search history.

(56) References Cited

U.S. PATENT DOCUMENTS

| 7,019,639 | B2 * | 3/2006 | Stilp | G08B 19/005 340/531 |
| 7,561,895 | B1 * | 7/2009 | Hohnstein | H01Q 1/1207 455/403 |
| 8,085,686 | B2 | 12/2011 | Thubert et al. | |
| 8,155,007 | B2 | 4/2012 | Thubert et al. | |
| 8,228,954 | B2 | 7/2012 | Thubert et al. | |
| 8,259,635 | B2 | 9/2012 | Thubert et al. | |
| 8,578,001 | B2 * | 11/2013 | Young | H04W 88/16 709/220 |
| 8,781,420 | B2 * | 7/2014 | Schlub | H01Q 1/243 455/115.1 |
| 2004/0070991 | A1 | 4/2004 | Agabekov et al. | |
| 2008/0215391 | A1 * | 9/2008 | Dowling | G06Q 30/0201 705/7.29 |
| 2012/0094600 | A1 * | 4/2012 | DelloStritto | A61B 5/0015 455/41.2 |
| 2012/0312874 | A1 * | 12/2012 | Jonsson | G06Q 10/087 235/385 |

OTHER PUBLICATIONS

Wikipedia, "Smart Lighting", [online], Feb. 2, 2013, [retrieved on Oct. 18, 2013]. Retrieved from the Internet: <URL: http://en.wikipedia.org/w/index.php?title=Smart_Lighting&printable=yes>, pp. 1-22.

* cited by examiner

Primary Examiner — Sharad Rampuria
Assistant Examiner — Obidon Bassinan
(74) Attorney, Agent, or Firm — Leon R. Turkevich

(57) ABSTRACT

In one embodiment, a method comprises a wireless detector in a lighting element detecting a movable object within a prescribed detection zone of the wireless detector; and the lighting element sending a message identifying detection of the movable object to a remote gateway, allowing the remote gateway to locate the movable object.

24 Claims, 5 Drawing Sheets

NETWORK-ENABLED LIGHT FIXTURE FOR LOCATING MOVABLE OBJECT

TECHNICAL FIELD

The present disclosure generally relates to locating movable objects, for example portable network-enabled devices in a wireless network, individuals wearing Radio Frequency Identification (RFID) badges, or individuals via infrared or heat detection sensors.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Location of network-enabled devices has been limited generally by the ability to provide overlapping coverage areas by multiple transceivers within a prescribed geographical region while minimizing interference between the transceivers. Hence, the location of a network-enabled device is determined by its connection with a corresponding one of the wireless transceivers, for example a cellphone tower, a wireless mobile router, or an identified wireless access point.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises a wireless detector in a lighting element detecting a movable object within a prescribed detection zone of the wireless detector; and the lighting element sending a message identifying detection of the movable object to a remote gateway, allowing the remote gateway to locate the movable object.

In another embodiment, an apparatus comprises light emitting circuitry; a wireless detector; and a network transceiver, where the apparatus implemented as a lighting element. The wireless detector is configured for detecting a movable object within a prescribed detection zone of the wireless detector. The network transceiver is configured for sending a message identifying detection of the movable object to a remote gateway, allowing the remote gateway to locate the movable object.

Detailed Description

Particular embodiments enable precise location identification of a movable object (e.g., a portable network-enabled device, an individual wearing an RFID badge, etc.) based on network-enabled lighting elements configured for detecting the movable object and sending a message to a prescribed gateway identifying detection of the movable object. Each network-enabled lighting element can be configured for detecting the movable object according to a prescribed wireless protocol within a prescribed wireless range of the corresponding network-enabled light fixture. Moreover, an array of the network-enabled lighting elements can be deployed in a manner that enables the prescribed gateway to locate the movable object based on the corresponding unique address (e.g., Media Access Control (MAC) address) of the lighting element.

Hence, the network-enabled lighting element enables deployment in a manner that provides a greater accuracy than existing systems such as WiFi identification, as the detection zone for the network-enabled lighting element is substantially smaller than a single coverage zone of a wireless access point.

Figure 1:
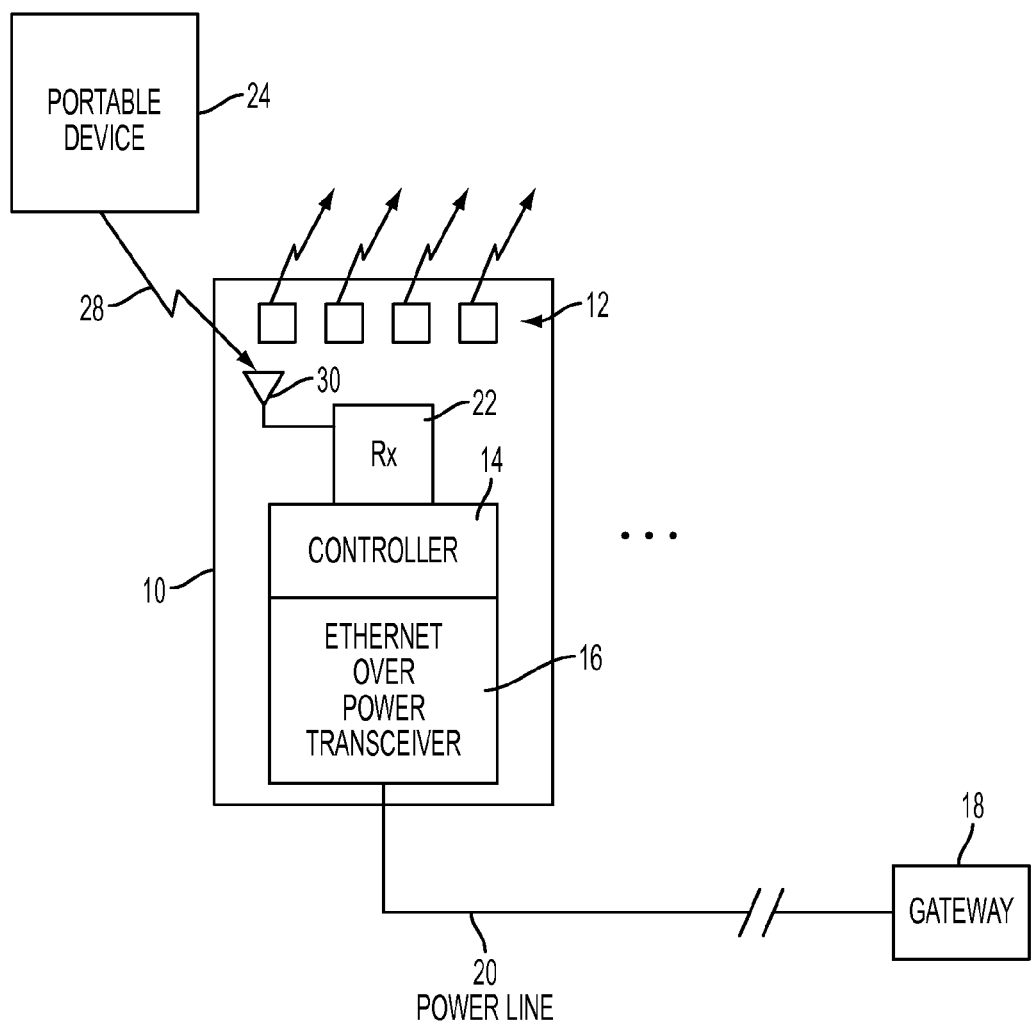
FIG. 1 illustrates an example lighting element having a wireless detector configured for detecting a movable object, according to an example embodiment.

FIG. 1 is a diagram illustrating an example network-enabled lighting element 10, according to an example embodiment. The network-enabled lighting element 10 can include light emitting circuitry 12 (illustrated as one or more light emitting diodes (LEDs)), lighting control circuitry 14, and a network transceiver 16. The lighting element 10 can be implemented as an LED light bulb.

The transceiver 16 can be configured for receiving a lighting control message from a remote gateway 18 via a power line 20: an example network transceiver is a Power over Ethernet (PoE) transceiver compliant with IEEE 802.3at-2009, or a "HomePlug AV Certified" network interface compliant with IEEE 1901.2010. The lighting control circuitry 14 can be configured for controlling the light emitting circuitry 12 in response to the lighting control message, enabling the gateway 18 to remotely control the light emitting circuitry 12 (e.g., On/Off/High Power/Low Power; modulated light controls; Red Color, Yellow Color, Green Color, etc.).

Figure 2A:
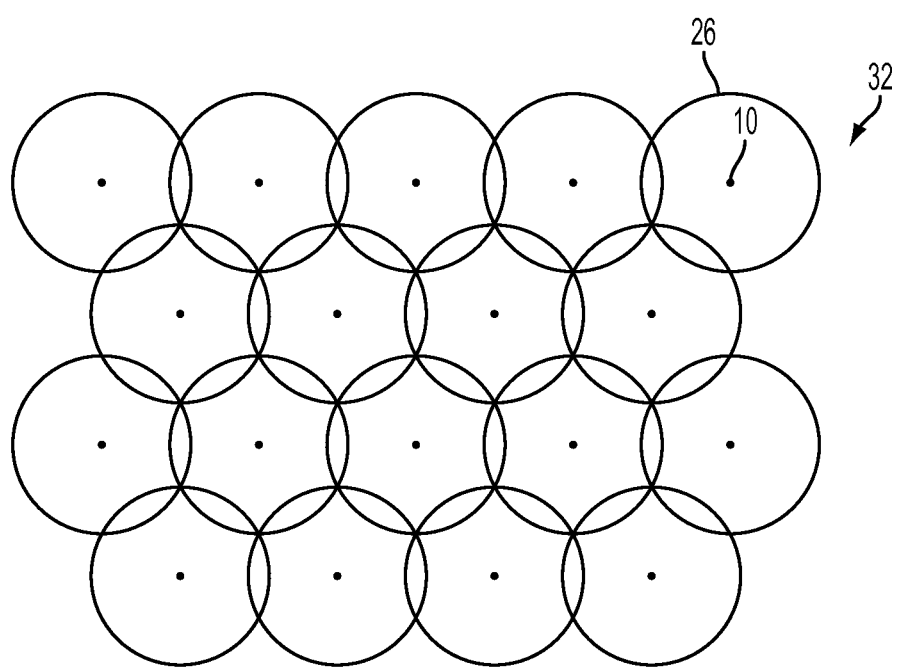
FIGS. 2A, 2B and 2C illustrate sample deployments of an array of lighting elements having a corresponding array of lighting element detection zones for locating a movable object, compared to coverage areas provided by wireless access points, according to an example embodiment.

According to an example embodiment, the network-enabled lighting element 10 also includes a wireless detector 22 configured for detecting a movable object 24 that is within a prescribed detection zone (26 of FIG. 2A). The wireless detector 22 within the lighting element 10 can be configured as a passive wireless receiver that does not transmit any wireless signal (i.e., receiver-only) but that only detects wireless signals 28 via an antenna 30, such that the lighting element 10 does not transmit any wireless network signal; hence, the wireless detector 22 can be implemented as a passive WiFi receiver, or an infrared sensor (i.e., heat sensor) for detecting moving objects ("humans") warmer than an ambient threshold (i.e., room temperature). The wireless detector 22 also can be configured as a passive RFID detector that detects an RFID code output by the movable object 24.

Hence, the network transceiver 16 can send to the remote gateway 18 a message identifying detection of the movable object 24, including relevant parameters such as received signal strength (RSSI) and/or MAC address (if the wireless detector 22 includes a passive WiFi receiver), an RFID identifier (if the wireless detector 22 includes an RFID detector), and/or a temperature value (if the wireless detector 22 includes a heat sensor). The message identifying detection of the movable object 24 can be distinct and independent from any lighting control message between the remote gateway 18 and the lighting control circuitry 14. Hence, the message identifying detection of the movable object 24 can allow the gateway 18 to locate the movable object, for example based on identifying the lighting element 10 having transmitted the message relative to a prescribed position of the lighting element; in other words, the message enables the remote gateway 18 to locate the movable object 24 based on at least the message, and optionally based on other prescribed attributes available to the remote gateway 18 (e.g., known position of the lighting element 10 having transmitted the message).

Figure 2B:
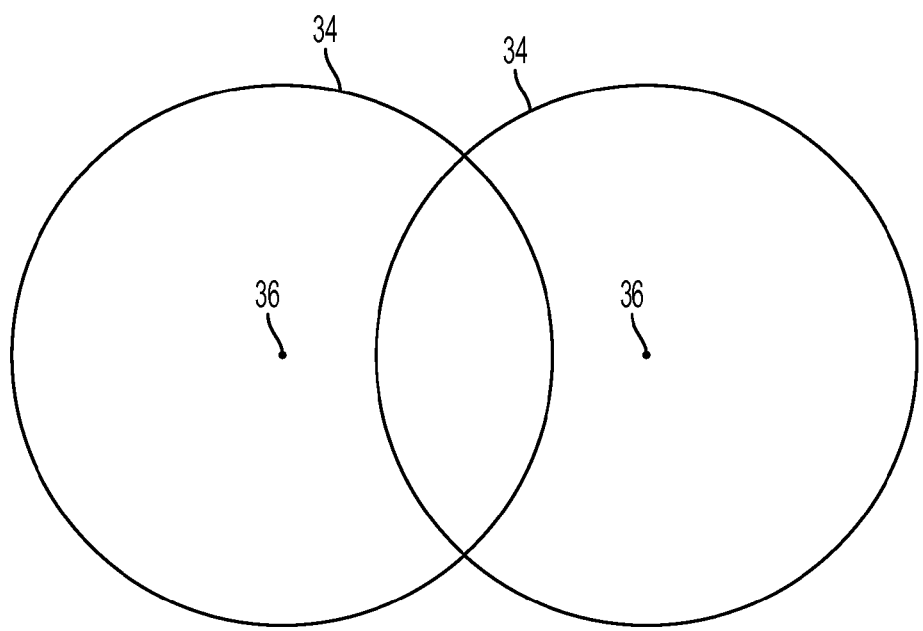
Figure 2C:
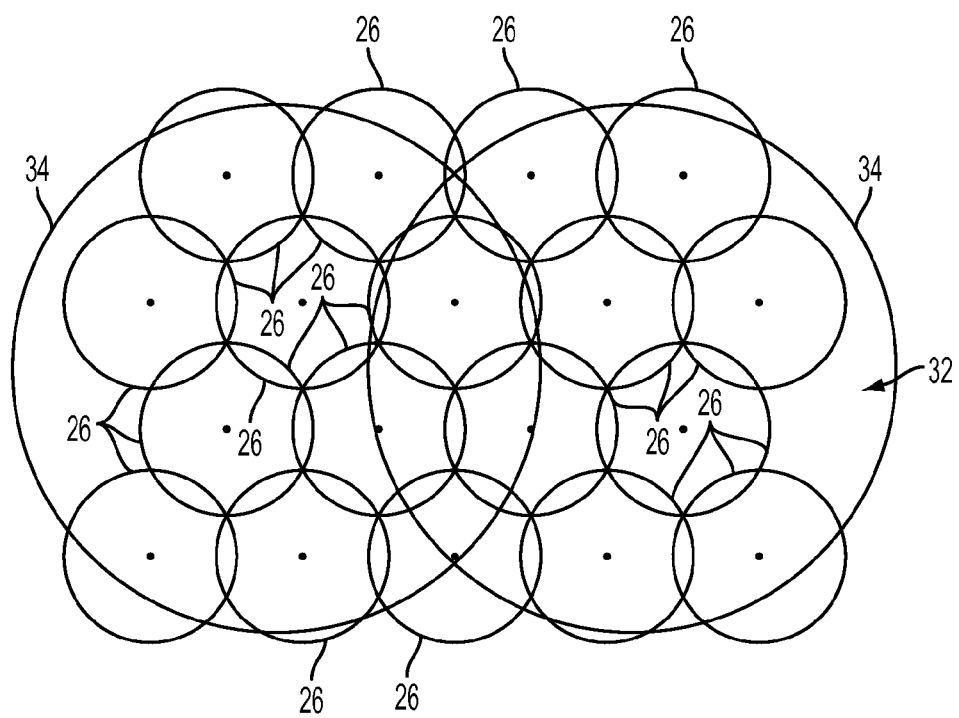

As illustrated in FIG. 2A, use of the disclosed lighting element 10 is particularly effective in locating the movable object 24 when deployed as an array 32 of lighting elements 10 having respective detection zones 26, where each lighting element 10 is individually addressable by the gateway 18. Hence, the gateway can locate the movable object 24 within the array 32 based on identifying the lighting element 10 having transmitted the message identifying location of the movable object. Moreover, since lighting fixtures tend to be implemented in regularly-repeating patterns both indoors and outdoors (e.g., on building floors, in indoor or outdoor parking lots, street lamps, etc.), the array 32 of detection zones 26 can be substantially more precise than the single coverage zone (34 of FIG. 2B) of a WiFi access point (36 of FIG. 2B), based on each detection zone 26 of the wireless detector 22 being substantially smaller than the single coverage zone 34 of the wireless access point 36. As illustrated in FIG. 2C, each detection zone 26 is "substantially smaller" (i.e., at least seven (7) detection zones 26 can fit into a single coverage zone 34).

Hence, the ubiquitous nature of lighting fixtures, in combination with "smart" (i.e., network enabled) control of lighting fixtures by a gateway 18, enables a low cost implementation of the lighting element 10 with a wireless detector 22 enabling precise detection of the movable object 24 within the array 32 of detection zones 26 established by the array 32 of lighting elements 10. Moreover, the typical line-of-sight applications of lighting fixtures ensures that the wireless detector 22 can detect a direct, line-of-sight signal from the portable device 24, without multipath interference as normally encountered by existing RF based transceivers such as the WiFi transceivers 36. Further, deployment of the lighting element 10 using a passive receiver can minimize RF interference (RFI).

Figure 3:
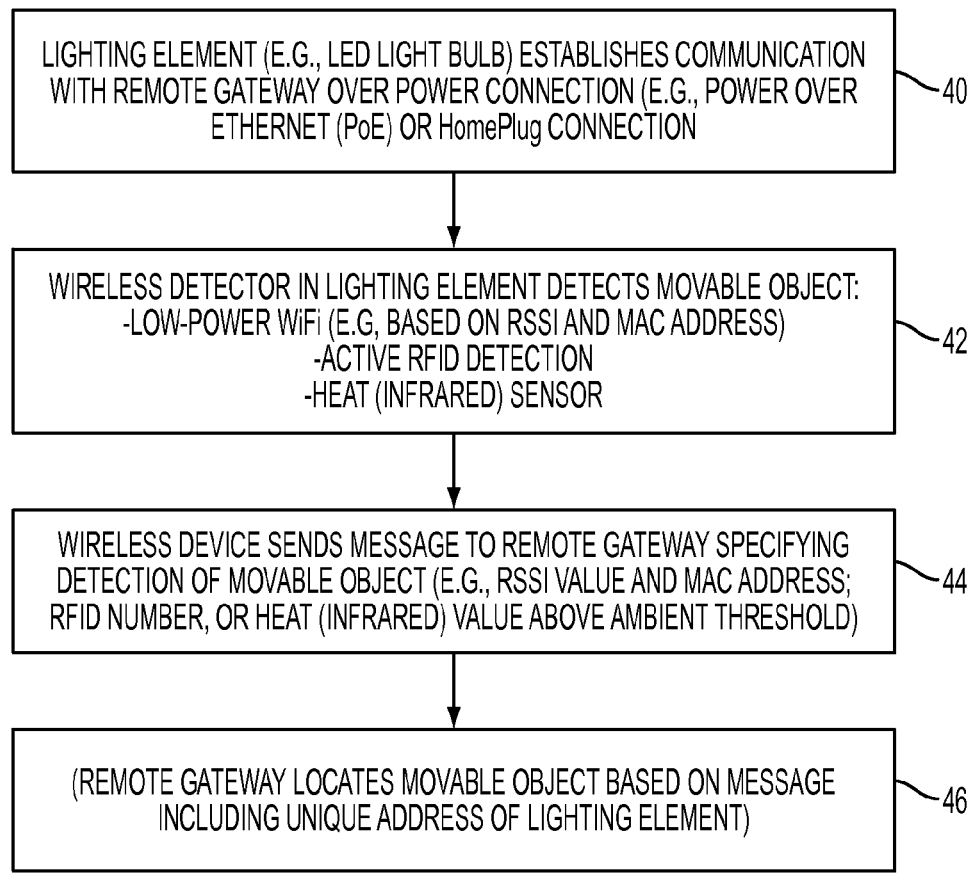
FIG. 3 illustrates an example method of a lighting element locating a movable object, according to an example embodiment.

FIG. 3 illustrates an example method of a lighting element locating a movable object, according to an example embodiment. The operations described in FIG. 3 can be implemented as executable code stored on a computer or machine readable non-transitory tangible storage medium (e.g., ROM, EEPROM, nonvolatile RAM, etc.) that are completed based on execution of the code by one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to FIG. 3 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The lighting control circuitry 14 of the lighting element 10 in operation 40 can establish a communication with the remote gateway 18 over a power connection 20, for example using Power over Ethernet (PoE) or a HomePlug connection. The wireless detector 22 in operation 42 can detect the movable object 24 within its corresponding prescribed detection zone 26 via different techniques: the wireless detector 22 can operate as a passive/low-power WiFi receiver that detects the RSSI and/or MAC address of the movable object 24; the wireless detector 22 can perform passive RFID detection of an RFID code transmitted by the movable object 24; the wireless detector 22 also can detect infrared (heat) energy if an infrared sensor is included in the wireless detector 22.

The lighting control circuitry 14 in response to the detection by the wireless detector 22 can generate in operation 44 a message specifying at least the address (e.g., MAC address) of the lighting element 10; however, the message generated by the lighting control circuitry 14 output by the transceiver 16 also can include an RSSI value and MAC address for the movable object 24, an RFID number, and/or a heat (infrared) value above an ambient (i.e., room temperature) threshold. Hence, the message enables the remote gateway 18 in operation 46 to locate the movable object 24 based on the unique address of lighting element 10 as specified in the message.

According to example embodiments, a wireless detector within a network-enabled light fixture with location enabled features allows significant improvement in location resolution, based on establishing a mesh/array of uniquely-addressable light fixtures each having wireless detectors.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   providing a light bulb comprising a wireless detector;
   detecting, by the wireless detector in the light bulb, a movable object within a prescribed detection zone of the wireless detector; and
   the light bulb sending a message identifying detection of the movable object to a remote gateway, allowing the remote gateway to locate the movable object.

2. The method of claim 1, wherein the detecting includes the wireless detector detecting the movable object via any one of a wireless network protocol, a radio frequency identification (RFID) protocol, or a heat sensor.

3. The method of claim 2, wherein the wireless detector is a passive detector that does not transmit any wireless network signal, the light bulb not transmitting any wireless network signal.

4. The method of claim 1, wherein the sending includes a transceiver in the light bulb sending the message to the remote gateway over a power line.

5. The method of claim 1, wherein the message is distinct from any lighting control message between the remote gateway and lighting control circuitry within the wireless detector.

6. The method of claim 1, wherein the light bulb is deployed within an array of said light bulbs, allowing the remote gateway to locate the movable object based on a corresponding identification of the light bulb within the array having sent the message.

7. The method of claim 6, wherein the array of said light bulbs provides a corresponding array of prescribed detection zones that are within a single coverage zone of a wireless access point, each detection zone of the wireless detector substantially smaller than the single coverage zone of the wireless access point.

8. An light bulb comprising:
   light emitting circuitry;

a wireless detector configured for detecting a movable object within a prescribed detection zone of the wireless detector; and a network transceiver configured for sending a message identifying detection of the movable object to a remote gateway, allowing the remote gateway to locate the movable object.

9. The light bulb of claim 8, wherein the wireless detector is configured for detecting the movable object via any one of a wireless network protocol, a radio frequency identification (RFID) protocol, or a heat sensor.

10. The light bulb of claim 9, wherein the wireless detector is a passive detector that does not transmit any wireless network signal, the light bulb not transmitting any wireless network signal.

11. The light bulb of claim 8, wherein the network transceiver is configured for sending the message to the remote gateway over a power line.

12. The light bulb of claim 8, further comprising a lighting control circuitry configured for controlling the light emitting circuitry in response to a lighting control message from the remote gateway, the message identifying detection of the movable object distinct from any lighting control message between the remote gateway and the lighting control circuitry.

13. A Logic encoded in one or more non-transitory tangible media for execution in a light bulb and when executed operable for:

the light bulb detecting, by a wireless detector in the light bulb, a movable object within a prescribed detection zone of the wireless detector; and the light bulb sending a message identifying detection of the movable object to a remote gateway, allowing the remote gateway to locate the movable object.

14. The logic of claim 13, wherein the detecting includes the wireless detector detecting the movable object via any one of a wireless network protocol, a radio frequency identification (RFID) protocol, or a heat sensor.

15. The logic of claim 14, wherein the wireless detector is a passive detector that does not transmit any wireless network signal, the light bulb not transmitting any wireless network signal.

16. The logic of claim 13, wherein the sending includes a transceiver sending the message to the remote gateway over a power line.

17. The logic of claim 13, wherein the message is distinct from any lighting control message between the remote gateway and lighting control circuitry within the wireless detector.

18. The logic of claim 13, wherein the light bulb is deployed within an array of said light bulbs, allowing the remote gateway to locate the movable object based on a corresponding identification of the light bulb within the array having sent the message.

19. The logic of claim 18, wherein the array of said light bulbs provides a corresponding array of prescribed detection zones that are within a single coverage zone of a wireless access point, each detection zone of the wireless detector substantially smaller than the single coverage zone of the wireless access point.

20. A network comprising:

an array of light bulbs, each light bulb comprising light emitting circuitry, a wireless detector configured for detecting a movable object within a prescribed detection zone of the wireless detector, and a network transceiver configured for outputting a message identifying detection of the movable object; and a gateway configured for controlling the light bulbs, the gateway further configured for locating the movable object based on the corresponding message from at least one of the light bulbs.

21. The method of claim 1, wherein the light bulb is a light emitting diode (LED) light bulb.

22. The light bulb of claim 8, wherein the light bulb is a light emitting diode (LED) light bulb.

23. The logic of claim 13, wherein the light bulb is a light emitting diode (LED) light bulb.

24. The network of claim 20, wherein one or more of the light bulbs is a light emitting diode (LED) light bulb.

* * * * *